(No Model.) 4 Sheets—Sheet 1.
J. McCAMMON.
VELOCIPEDE.
No. 465,140. Patented Dec. 15, 1891.
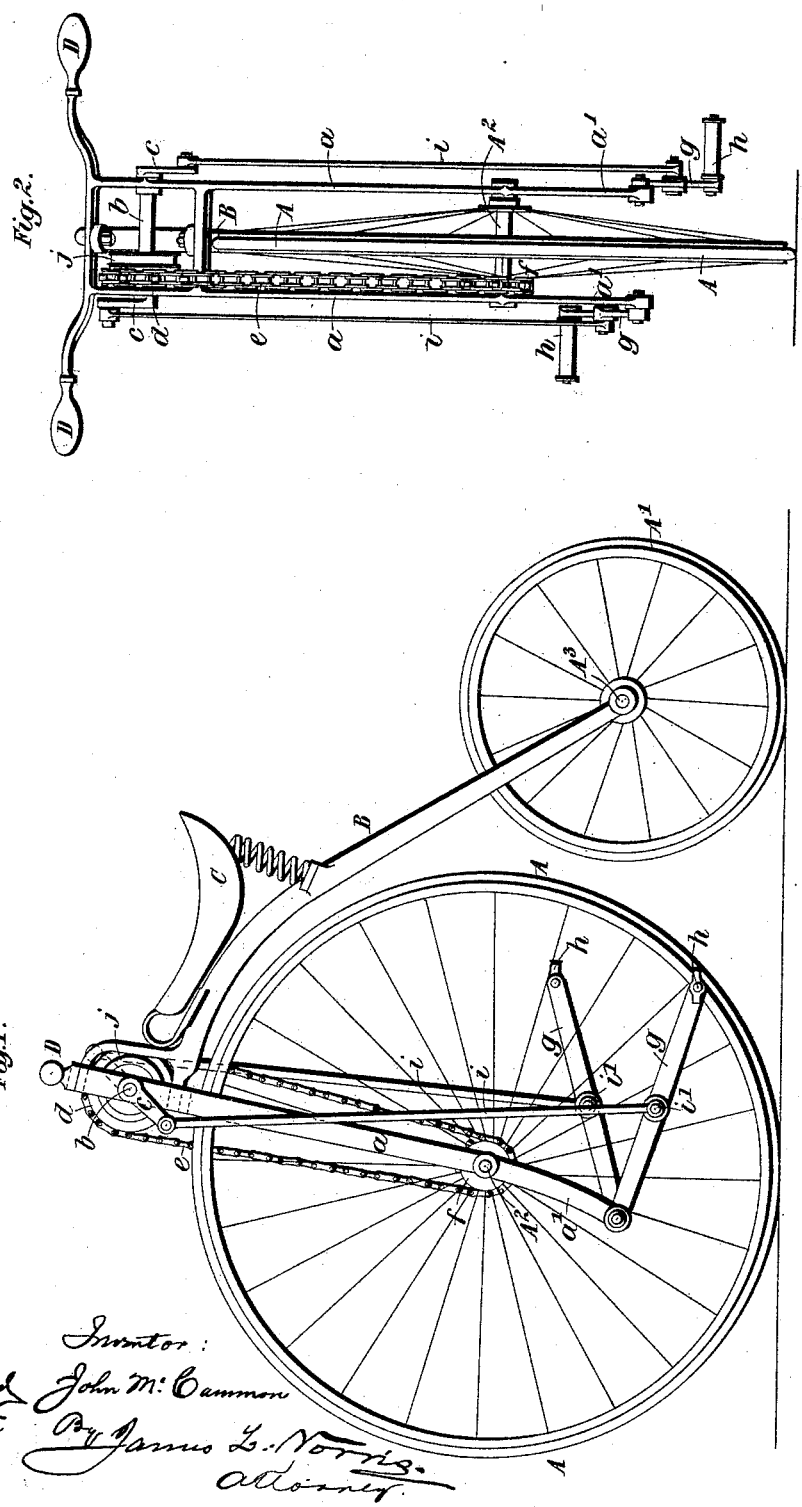

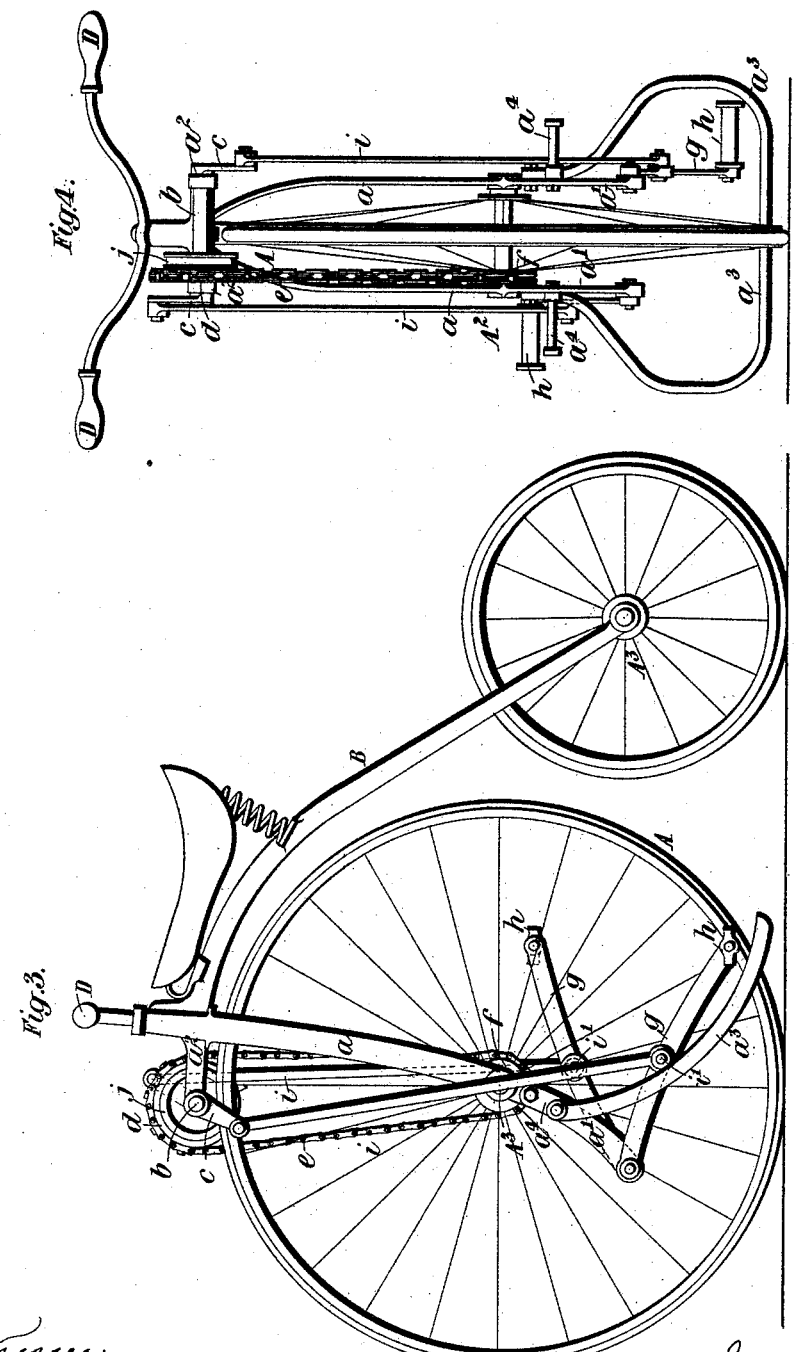

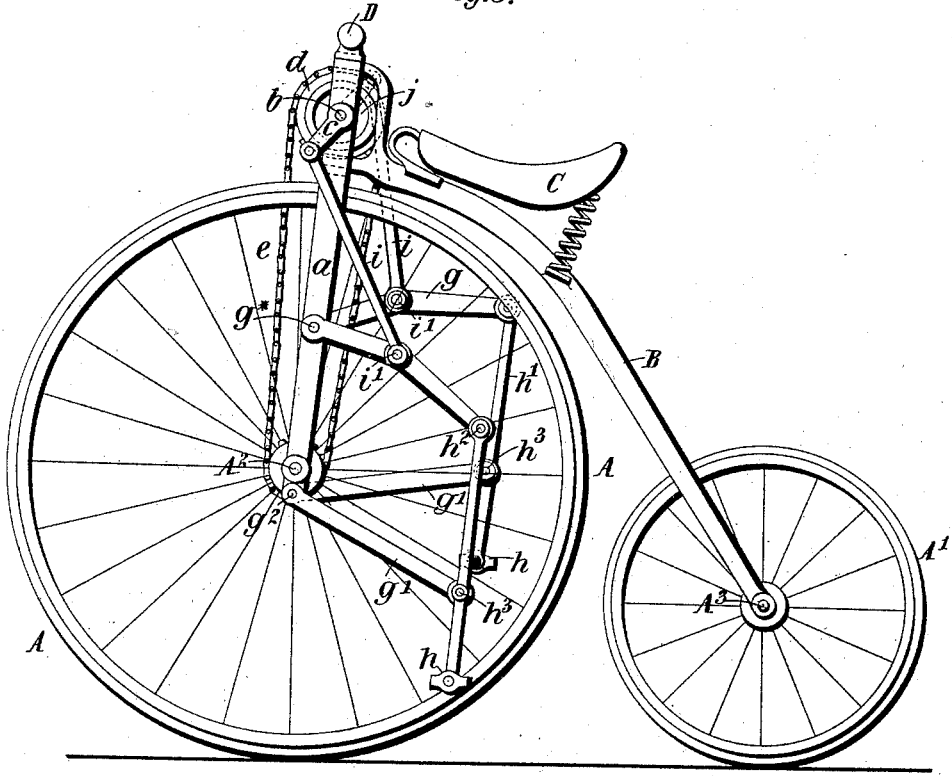

(No Model.) 4 Sheets—Sheet 4.

J. McCAMMON.
VELOCIPEDE.

No. 465,140. Patented Dec. 15, 1891.

Witnesses:
J. A. Rutherford
Geo. W. Rea.

Inventor:
John McCammon
By James L. Norris.
Attorney.

UNITED STATES PATENT OFFICE.

JOHN McCAMMON, OF EAST MELBOURNE, VICTORIA.

VELOCIPEDE.

SPECIFICATION forming part of Letters Patent No. 465,140, dated December 15, 1891.

Application filed February 7, 1891. Serial No. 380,636. (No model.) Patented in England September 16, 1889, No. 14,585.

*To all whom it may concern:*

Be it known that I, JOHN McCAMMON, engineer, a subject of the Queen of Great Britain, and a resident of East Melbourne, Victoria, Australia, have invented certain new and useful Improvements in Velocipedes, (for which I have obtained a patent in Great Britain, No. 14,585, bearing date September 16, 1889,) of which the following is a specification, reference being had to the accompanying drawings.

My invention relates to velocipedes of the kind or class wherein motion is communicated to the driving wheel or wheels from a separate crank-shaft or pedal-shaft through the medium of multiplying or other gear.

By my invention I secure lightness combined with increased strength and safety, and I am enabled to so arrange the parts of the machine that the position of the rider's body is more natural and admits of power being more economically applied than in velocipedes as heretofore constructed. Moreover, the steering qualities and general efficiency of the velocipedes are greatly improved. My said improvements are applicable to velocipedes having two or more wheels.

An important feature of my said invention consists in mounting the crank-shaft in suitable bearings in or attached to the fork or the like of the driving wheel or wheels in such a position that the said shaft is clear of the periphery of the said wheel or wheels. This shaft is suitably connected by chain or other gearing with the axle of the driving wheel or wheels.

Another important feature of my said invention consists in so constructing velocipedes of the kind or class above mentioned that the driving wheel or wheels will also serve as the steering wheel or wheels, the said wheel or wheels being preferably placed in the front or leading position. In some instances, however, I construct the said machine with a separate steering wheel or wheels connected with the driving wheel or wheels by means of a backbone or frame or other suitable connection.

In the accompanying drawings I have shown how my said invention may be conveniently and advantageously carried into practice.

Figure 6:
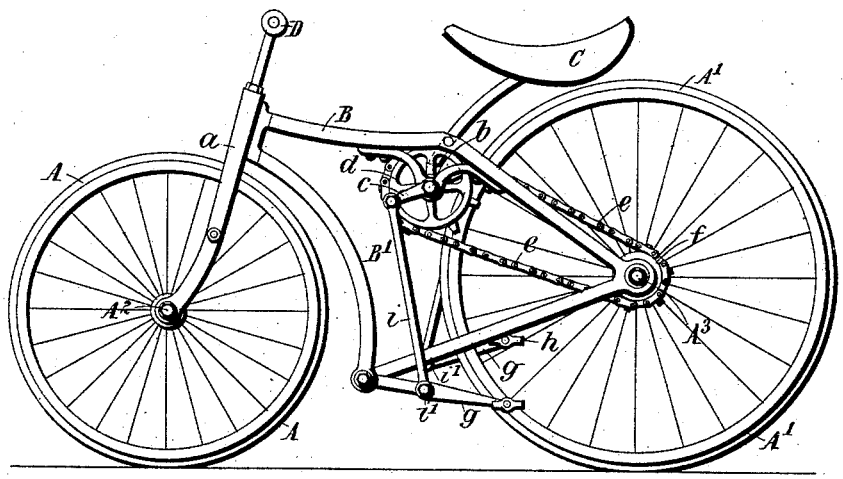
Figure 7:
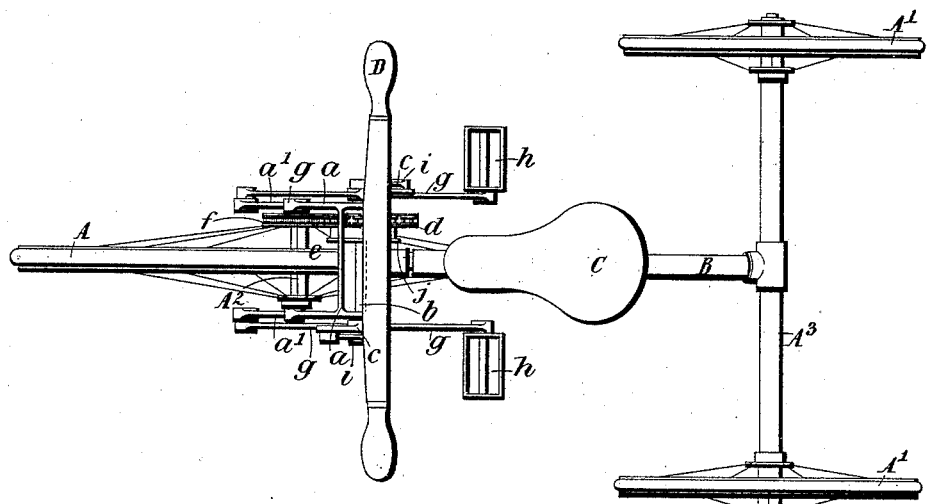

Figure 1 is a side elevation, and Fig. 2 a front elevation, showing one form of my improved velocipede. Figs. 3 and 4 are similar views showing another form or modification thereof. Figs. 5 and 6 are side elevations showing further modifications of my improved velocipede, and Fig. 7 is a plan showing my improvements applied to a tricycle.

Like letters indicate corresponding parts throughout the drawings.

A A' are the road or traveling wheels, which are secured upon axles $A^2$ $A^3$.

B is the backbone or frame.

C is the seat or saddle.

D is the steering handle, lever, or cross-bar.

In the form of my velocipede shown in Figs. 1 and 2 the axle $A^2$ of the driving and steering wheel A has mounted thereon a fork $a$, of suitable shape, united to the backbone or framing B by any suitable means, so that it can be freely turned relatively to the said backbone or framing by the cross-bar or steering-handle D in either direction for the purpose of steering. $b$ is a shaft or spindle supported in suitable bearings in the fork $a$ or in projections or extensions thereof. The shaft or spindle $b$ is placed parallel to the axle of the driving and steering wheel at any convenient point outside the circumference of the said wheel, and is provided at each extremity with a crank $c$. $d$ is a chain-wheel, which is firmly secured upon the crank-shaft $b$, and is connected by means of a driving chain or band $e$ with a corresponding chain-wheel $f$, secured to the axle $A^2$ or to one of the hubs of the driving-wheel A. The chain-wheels $d$ and $f$ are of any suitable relative sizes. $g$ $g$ are levers, each of which is provided at one extremity with a treadle $h$, and is pivoted at the other extremity to an extension $a'$ of one of the prongs of the fork $a$. $i$ $i$ are connecting-rods, by means of which the levers $g$ are coupled or connected to the cranks $c$. By this means it will be seen that an oscillating motion of the treadle-levers $g$ will produce a rotary motion of the crank-shaft $b$ and so drive or propel the machine. The pins $i'$ for connecting the rods $i$ with the treadle-levers $g$ are sometimes made adjustable along the said treadle-levers, so that the stroke of the treadles or the length of the arcs of circles described by them may be varied to suit different riders, or the treadles $h$ may be made adjustable along the treadle-levers $g$ for the same purpose. The saddle C is mounted on a suitable part of the frame or backbone B in any convenient manner, and the handle or steering-lever D may be forged in one piece with the fork $a$ or firmly attached to it by any suitable means. A stop or stops are provided, if required, to prevent the turning of the steering-fork $a$ too far and the bringing of the chain-wheel $d$ or the driving chain or band $e$ in contact with the backbone or frame B. $j$ is a drum or pulley attached to the chain-wheel $d$ or fixed on the crank-shaft $b$. A brake-strap is passed around the said drum or pulley $j$, and a suitable lever so placed as to be within convenient reach of the rider is provided for applying the said strap to the drum or pulley. The brake-strap and operating-lever are omitted from the drawings for the sake of clearness. Any other suitable brake apparatus may be employed, if desired.

Figs. 3 and 4 illustrate another modification of my invention, wherein the shaft or spindle $b$ is supported in suitable bearings in arms or projections $a^2$, firmly attached to or formed in one with the fork $a$. This arrangement admits of the said fork $a$ being so constructed as to approach more closely in shape to that of the steering-forks usually employed. $a^3$ is a guard for obviating any chance of injury to the treadle-levers should the machine be accidentally overturned. $a^4\ a^4$ are footrests formed on the said guard.

Fig. 5 shows a further modification, in which the pedal-levers $g$ are pivoted at $g^*$ to the fork $a$ above the axle of the driving-wheel A. The pedals $h$ are in this case secured upon the lower extremities of rods $h'$, the upper extremities of which rods are jointed at $h^2$ to the said pedal-levers $g$. $g'\ g'$ are connecting-rods coupled at $h^3$ to the rods $h'$ and at $g^2$ to the fork $a$ or to extensions thereof, thus forming parallel-motion apparatus.

Fig. 6 illustrates a modification wherein the shaft or spindle $b$, carrying the chain-wheel $d$, is supported in suitable bearings in the backbone or frame B or in suitable brackets secured thereto, and the chain-wheel $f$ is secured upon the axle $A^3$ of the rear wheel $A'$, which in this instance forms the driving-wheel. The levers $g$ are pivoted to an extension $B'$ of the said backbone or frame.

Fig. 7 shows an application of my improvements to a tricycle or velocipede having three wheels. The general arrangement is in this case substantially similar to that hereinbefore described with reference to Figs. 1 and 2.

By the improvements above described I am enabled to so construct a bicycle or tricycle or other velocipede that the center of gravity of the rider will be very low and comparatively far behind the center of the driving-wheel, and will, moreover, be directly above the pedals, thus insuring great safety, while permitting the rider to fully utilize his weight for driving the machine.

The improved velocipede can be made very light, and may, if desired, be provided with any suitable multiplying-gear to adapt it for racing or other purposes.

Although I prefer the forms of construction hereinbefore described, I do not confine myself to the particular arrangements of parts for transmitting motion from the foot pedals or treadles to the cranks, as any convenient devices may be employed for this purpose. Moreover, it is obvious that I can somewhat further modify the construction of my improved velocipede without departing from the nature of my said invention. For instance, in some cases the crank-shaft $b$ is placed near the ground and carried by a prolongation or extension of the fork $a$. In these cases the said crank-shaft may be driven directly by pedals attached to the cranks in the usual manner.

In another form or modification of my improved velocipede I employ the rear wheel or wheels for steering, the said wheel or wheels being connected by suitable rods and levers with the steering handle, lever, or cross-bar in front of the saddle.

I sometimes place the driving-wheel in the rear instead of in the leading position, and in such cases I sometimes employ the front wheel or wheels for the purpose of steering the machine. In other cases I arrange the saddle on an arm or bracket of suitable shape formed on or firmly attached to the fork or front portion of the frame, and I secure the steering-handle to the backbone and use the trailing wheel for steering.

If desired, the crank-shaft is made adjustable, so that the driving chain or band can be tightened when necessary.

What I claim is—

1. The combination, with the backbone or framing B and fork $a$, of a crank-shaft $b$, crank $c$, chain-wheels $d$ and $f$, chain $e$, levers $g$, pivoted to the fork, and connecting-rods $i$, substantially as described.

2. The combination, with the backbone or framing B and fork $a$, of a crank-shaft $b$, crank $c$, chain-wheels $d$ and $f$, chain $e$, levers $g$, pivoted to the fork and having treadles $h$ at their free extremities, connecting-rods $i$, and brake $j$, substantially as described.

3. The combination, with a crank-shaft mounted in suitable bearings in or attached to the frame of a velocipede and connected with the driving-axle by means of chain or other suitable gearing, of parallel-motion apparatus comprising levers pivoted to the fork of the driving-wheel and coupled to the said crank-shaft and provided with suitable treadles, substantially as and for the purposes set forth.

In testimony whereof I have hereunto signed my name in the presence of two subscribing witnesses.

JOHN McCAMMON.

Witnesses:
 JOSEPH H. BUSH,
  *U. S. Consulate-General, Melbourne.*
 GEO. H. WALLACE.